(12) United States Patent  (10) Patent No.: US 8,327,967 B2
Schapf  (45) Date of Patent: Dec. 11, 2012

(54) DRIVELINE FOR OFF-ROAD VEHICLE (75) Inventor: Ronald Schapf, Ottawa (CA)

(73) Assignee: Bombardier Recreational Products Inc., Valcourt (CA)

( * ) Notice: Subject to any disclaimer, the term of this patent is extended or adjusted under 35 U.S.C. 154(b) by 202 days.

(21) Appl. No.: 12/863,081

(22) PCT Filed: Jan. 31, 2008

(86) PCT No.: PCT/US2008/052641
§ 371 (c)(1),
(2), (4) Date: Jul. 15, 2010

(87) PCT Pub. No.: WO2009/096975
PCT Pub. Date: Aug. 6, 2009

(65) Prior Publication Data
US 2011/0042160 A1 Feb. 24, 2011

(51) Int. Cl.
B60K 17/34 (2006.01)
(52) U.S. Cl. ........................ 180/244; 180/233
(58) Field of Classification Search .................. 180/233, 180/244
See application file for complete search history.

(56) References Cited

U.S. PATENT DOCUMENTS

| 4,671,377 | A | | 6/1987 | Ehrlinger et al. |
| 5,435,793 | A | * | 7/1995 | Varela et al. ................... 475/311 |
| 5,688,202 | A | * | 11/1997 | Bowen .......................... 475/199 |
| 7,111,377 | B2 | | 9/2006 | Imamura et al. |
| 2007/0026983 | A1 | | 2/2007 | Shimizu et al. |
| 2007/0181358 | A1 | * | 8/2007 | Nakagaki et al. ............. 180/233 |

FOREIGN PATENT DOCUMENTS

| EP | 0315200 A1 | 5/1989 |
| EP | 0316070 A1 | 5/1989 |
| EP | 0389957 A1 | 10/1990 |

* cited by examiner

Primary Examiner — Lesley D Morris
Assistant Examiner — Michael Stabley
(74) Attorney, Agent, or Firm — BCF LLP (57) ABSTRACT An off-road vehicle is disclosed which comprises a driveline assembly unit operative ly connecting the propeller shaft to the front or rear wheel assemblies. The driveline assembly unit includes a main housing, a slip clutch torque limiting mechanism, and a wet brake clutch assembly. The slip clutch torque limiting mechanism and the wet brake clutch assembly being housed within the main housing and are coaxial with the propeller shaft of the off-road vehicle. A driveline unit is also disclosed that combines torque limiting and brake functions.

23 Claims, 12 Drawing Sheets

DRIVELINE FOR OFF-ROAD VEHICLE

FIELD OF THE INVENTION

The present invention relates generally to off-road vehicles and in particular to a driveline unit for an off-road vehicle that combines torque limiting and brake functions.

BACKGROUND OF THE INVENTION

Off-road vehicles are generally equipped with disk and friction pad type brake systems to provide braking to the off-road vehicle. U.S. Pat. No. 6,883,630 which is incorporated herein by reference discloses front disk brake assemblies mounted on the left and right coupling members of the universal joint extending on the left and right side of the front differential each of which are connected to the respective left and right half shafts transmitting power from the front differential to the front wheels. The left and right brake calipers are rigidly mounted to the housing structure of the front differential. The rear brake system disclosed in U.S. Pat. No. 6,883,630 consists of a single disk brake assembly mounted to the yoke of the universal joint at the front of the rear angle drive connecting the drive shaft extending from the engine to the rear angle drive. The single disk brake therefore rotates with the drive shaft while the rear brake caliper is rigidly mounted to the housing structure of the rear angle drive.

While this system works well and provides sufficient braking under dry and wet conditions, there are conditions such as when the off-road vehicle is going through water or a wet marsh where the friction between the brake pads and the brake disk is reduced and thus the braking force is also reduced. There are other instances where the brake disks may become covered with mud or other dirt and thus the braking force would also be reduced.

The rear drive train of a conventional off-road vehicle has a solid drive shaft connected between the engine and the rear angle drive assembly. The drive shaft transfers the torque from the engine transmission to the left and right rear half shafts to rotate the wheels and provide motive force to the rear wheels. Torque is delivered un-interrupted from the engine to the wheels. In some cases, when the wheels of the off-road vehicle are lifted off the ground, such as when the off-road vehicle jumps over bumps while torque is still being transferred to the wheels from the engine, a very high torque is generated in the drive train components when the wheels are suddenly brought back into contact with the ground under the weight of the vehicle. To prevent failure, the components of the drive train must be sized accordingly and thus are bigger/heavier and more costly than would be if they had to be designed only to deal with engine torque.

To reduce component size while maintaining durability and preventing failure, slip clutches are placed within the drive train. A slip clutch is a series of alternating drive and driven discs which are forced into contact with each other by spring mechanisms such as Belleville washers or a series of standard coil springs. The drive discs are connected to the upstream side of the drive line and the driven discs are connected to the downstream side of the drive line. Torque must pass through the drive and driven discs in order to go from the engine to the wheels and vice versa. The amount of torque which the slip clutch can transmit, without slip between the drive and driven discs, is determined by the force applied to the discs stack by spring mechanism. The force required by the spring mechanism is determined by the maximum torque to be resisted by the components of the drive train. Any torque higher than the maximum torque will cause slip within the slip clutch which will protect the drive train components.

Thus, there is a need for an off-road vehicle having a compact driveline that alleviates some of the drawbacks of conventional drive trains and braking systems of off-road vehicles.

STATEMENT OF THE INVENTION

One object of the present invention is to provide an off-road vehicle having a slip clutch torque limiting mechanism and a wet brake clutch assembly.

One aspect of the present invention provides an off-road vehicle comprising: a frame; a pair of front wheels connected to the frame through a front suspension and a pair of rear wheels connected to the frame through a rear suspension; at least one seat mounted on the frame for supporting a rider; a steering assembly disposed on the frame and operatively connected to the pair of front wheels for steering the vehicle; an engine disposed on the frame; a bevel gear assembly; a propeller shaft operatively connecting the engine with the bevel gear assembly; left and right half shafts connecting the bevel gear assembly to one of the pair of front wheels and the pair of rear wheels; and a driveline assembly unit operatively connecting the propeller shaft with the bevel gear assembly; the driveline assembly unit including: a main housing, a slip clutch torque limiting mechanism operatively connected to the propeller shaft, a wet brake clutch assembly operatively connecting to the slip clutch torque limiting mechanism and the bevel gear assembly; the slip clutch torque limiting mechanism and the wet brake clutch assembly being housed within the main housing.

In another aspect, the bevel gear assembly is housed within the main housing of the driveline assembly unit.

In a further aspect, the slip clutch torque limiting mechanism includes: an outer slip clutch member; an inner slip clutch member; drive discs and driven discs between the outer slip clutch member and the inner slip clutch member; and a biasing member adapted to apply pressure to the drive discs and driven discs; the wet brake clutch assembly and the slip clutch torque limiting mechanism being operatively connected through the outer slip clutch member of the slip clutch torque limiting mechanism.

In an additional aspect, the main housing contains lubricating fluid; the slip clutch torque limiting mechanism and the wet brake clutch assembly being lubricated by the same lubricating fluid.

In an additional aspect, the wet brake clutch assembly is actuated by a ball ramp assembly positioned within the main housing the driveline assembly unit.

In a further aspect, the wet brake clutch assembly includes: a stack of alternating rotating and stationary discs. The entire disc stack being axially movable via the ball ramp assembly which includes: a drive cam and a driven cam positioned adjacent the stack of rotating and stationary discs, and a series of steel balls positioned between the drive cam and the driven cam; one of the drive cam and driven cam including rising depth slots in which the steel balls are placed such that a rotation of one of the cams increases the distance between the drive cam and driven cam and applies an axial force to the rotating and stationary disc stack.

In an additional aspect, the wet brake clutch assembly includes a hydraulic piston and the drive cam includes a lever connected to the hydraulic piston.

In a further aspect, the wet brake clutch assembly includes a brake cable and the drive cam includes a lever connected to the brake cable.

In an additional aspect, the off-road vehicle includes two driveline assembly units, a first driveline assembly unit operatively connected to the rear wheels and a second driveline assembly unit operatively connected to the front wheels.

In a further aspect, the bevel gear assembly is of the differential type which allows relative rotational movement between the left and right wheels.

Another aspect of the present invention provides an off-road vehicle comprising: a frame; a pair of front wheels connected to the frame through a front suspension and a pair of rear wheels connected to the frame through a rear suspension; at least one seat mounted on the frame for supporting a rider; a steering assembly disposed on the frame and operatively connected to the pair of front wheels for steering the vehicle; an engine disposed on the frame; a bevel gear assembly; a propeller shaft operatively connecting the engine with the bevel gear assembly; left and right half shafts connecting the bevel gear assembly to one of the pair of front wheels and the pair of rear wheels; and a driveline assembly unit operatively connecting the propeller shaft with the bevel gear assembly; the driveline assembly unit including: a main housing, a slip clutch torque limiting mechanism operatively connected to the propeller shaft, a wet brake clutch assembly operatively connecting to the slip clutch torque limiting mechanism and the bevel gear assembly; the propeller shaft, the slip clutch torque limiting mechanism and the wet brake clutch assembly being coaxial.

An additional aspect of the present invention provides a driveline assembly unit including: a main housing containing lubricating fluid, a slip clutch torque limiting mechanism; and a wet brake clutch assembly; the slip clutch torque limiting mechanism and the wet brake clutch assembly both supported and housed within the main housing; the slip clutch torque limiting mechanism including: an outer slip clutch member; an inner slip clutch member; a stack of drive and driven discs between the outer slip clutch member and the inner slip clutch member; and a biasing member adapted to apply pressure to the stack of drive and driven discs; the wet brake clutch assembly including: a stack of rotating and stationary discs, and an actuator for applying an axial force to the stack of rotating and stationary discs;

In a further aspect of the invention, the wet brake clutch assembly is actuated by a ball ramp assembly including: a drive cam and a driven cam positioned adjacent to the stack of rotating and stationary discs, and a series of steel balls positioned between the drive cam and the driven cam; one of the drive cam and driven cam including rising depth slots in which the steel balls are placed such that a rotation of one of the cams increases the distance between the drive cam and driven cam and applies an axial force to the stack of rotating and stationary discs.

In a further aspect of the invention the driveline assembly unit further comprises a bevel gear assembly positioned within the main housing and operatively connected to the wet brake clutch assembly and the slip clutch torque limiting mechanism.

For purposes of this application the term "off-road vehicle" refers to a vehicle which is typically used on unpaved surfaces such as a recreational utility vehicle (RUV) or an all-terrain vehicle (ATV). It should be understood that off-road vehicles could be used on paved surfaces, however they are specifically designed for riding on unpaved surfaces. An ATV refers to a wheeled vehicle designed for off-road use that travels on low pressure tires and has straddle seat. An RUV refers to an "opened" wheeled vehicle (contrary to a pickup truck which is a "closed" vehicle due to its closed passenger cabin) designed for off-road use which usually has side-by-side seating. Also, terms related to spatial orientation such as forwardly, rearwardly, left, and right, are as they would normally be understood by a driver of the vehicle sitting thereon in a normal driving position.

Embodiments of the present invention each have at least one of the above-mentioned aspects, but not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects and advantages of the embodiments of the present invention will become apparent from the following description, the accompanying drawings and the appended claims.

BRIEF DESCRIPTION OF THE DRAWINGS

For a better understanding of the present invention as well as other aspects and further features thereof, reference is made to the following description which is to be used in conjunction with the accompanying drawings, where.

DESCRIPTION OF PREFERRED EMBODIMENT(S)

Figure 1:
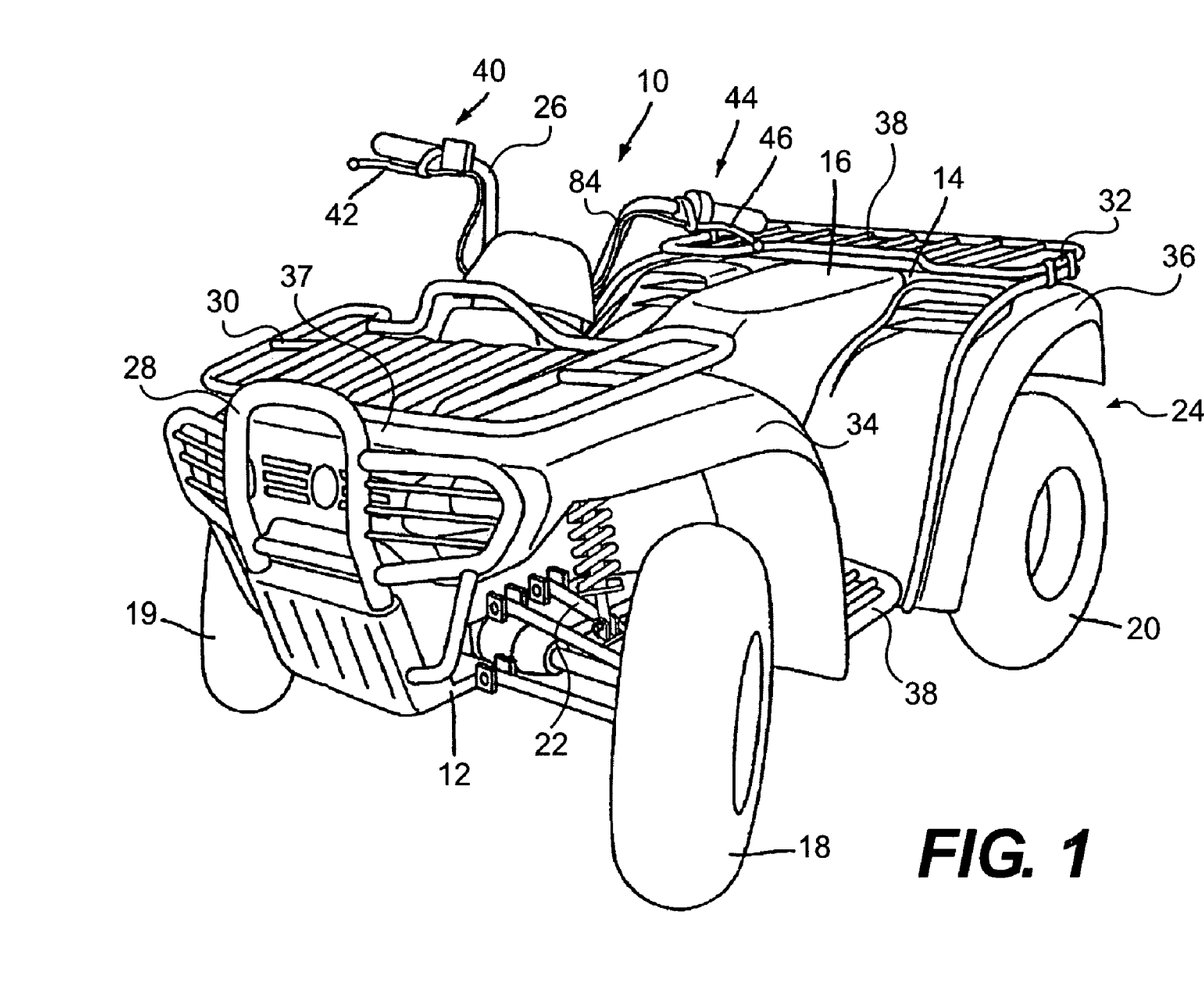
FIG. 1 is a front left perspective view of an all-terrain vehicle (ATV) equipped with a driveline assembly unit in accordance with one embodiment of the invention.

FIG. 1 shows an all-terrain vehicle (ATV) 10 equipped with a driveline unit described in greater details below. The ATV 10 comprises a frame structure 12, which extends substantially the entire length of the ATV 10. A body portion 14 is disposed above and connected to the frame structure 12 and preferably includes a straddle-type seat 16 thereon. The ATV 10 is of a 4-wheel drive type. The ATV 10 includes a pair of front wheel assemblies 18, 19 and a pair of rear wheel assemblies 20, 21 connected to the frame 12 through front and rear suspensions 22 and 24 respectively. A steering system which includes a steering member in the form of handlebars 26 is disposed in front of the straddle-type seat 16 and is connected to the front wheel assemblies 18 and 19 to transfer steering commands of the rider to the front wheels to steer the ATV 10. A front brake actuating mechanism 40 including a lever member 42 that is actuable by the user's hand is mounted on the right-hand side of the handlebars 26. A rear brake actuating mechanism 44 including a lever member 46, also actuable by the user's hand, is mounted on the left-hand side of the handlebars 26. A pedal member (not shown) may also be used to actuate the rear brakes. Alternatively, other configuration of brake system can be used where a brake actuating mechanism 44 including a lever member 46, also actuable by the user's hand, is mounted on the left-hand side of the handlebars 26 actuate both front and rear brake. The ATV 10 also features a front bumper 28, a front carriage rack 30 and a rear carriage rack 32 disposed over the body portion 14. The body portion 14 includes front and rear fenders 34 and 36 respectively, footrests 38 on either side of the ATV 10 and joining the front end rear fenders 34 and 36, and fairing elements 37 and 38 covering the front and rear portion of the ATV 10 respectively.

Figure 2:
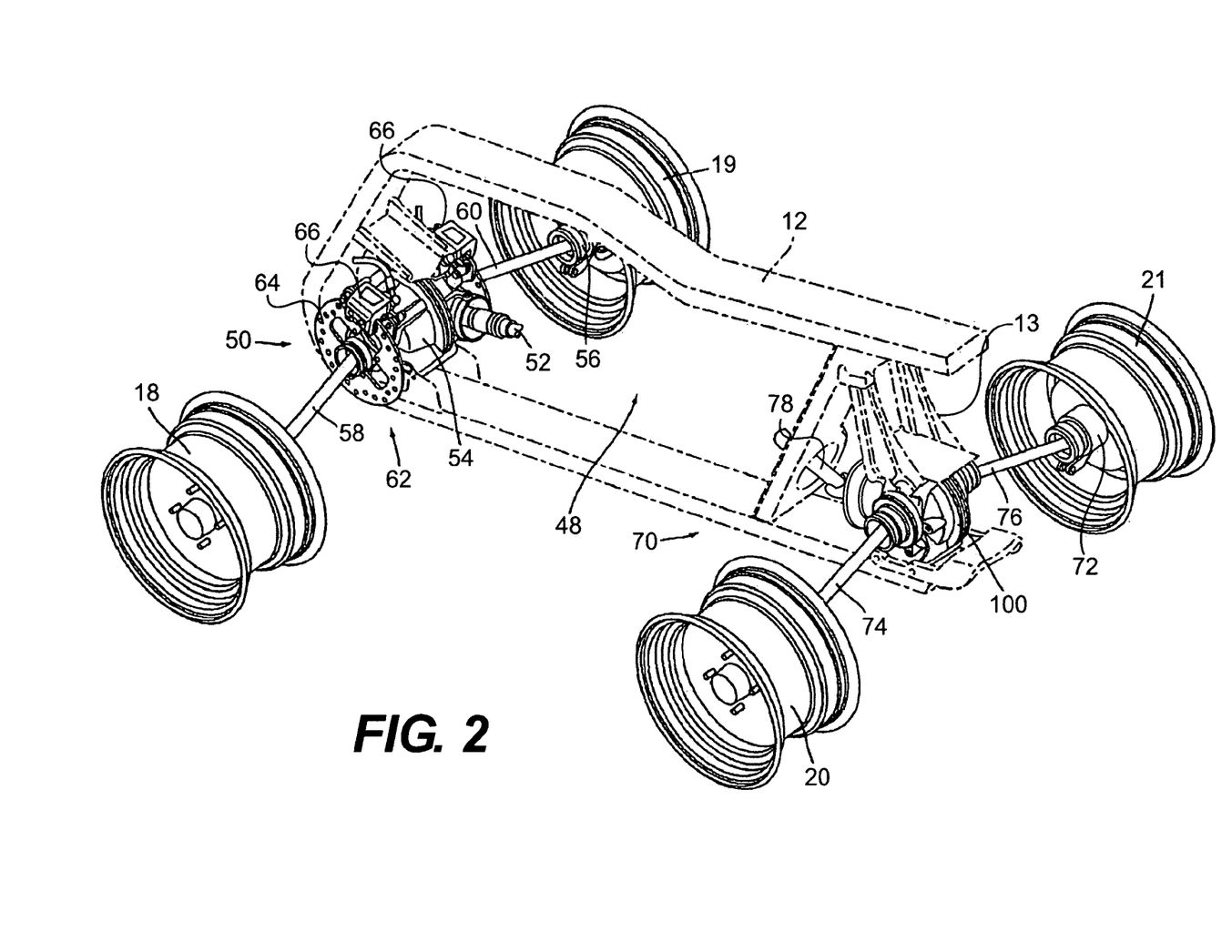
FIG. 2 is a rear left perspective view of a frame in phantom lines including a possible embodiment of a rear drive train for the ATV of FIG. 1.

As shown in FIG. 2, the frame structure 12 defines an engine-receiving opening, indicated at 48 within which a power unit, e.g., an engine (not shown), may be positioned. Preferably, the engine includes an integral transmission or has a transmission operatively coupled thereto (not shown) such as the engine/transmission assembly described in published US application No. 2006-0231322 which is herein incorporated by reference in its entirety. The front drive system 50 includes a drive shaft or propeller shaft, 52, which is connected to and transfers power between the transmission and a gear box 54. It is noted that the gear box 54 may be a differential type gear box, which allows relative rotational movement between the left and right wheel assemblies 18 and 19. A Visco-Lok® type differential may also be used. FIG. 2 shows the gear box 54 as a differential type gear box, however, it is possible for any other type of gear box that is capable of transferring power between the propeller shaft 52 and wheel assemblies 18, 19 to be used. The gear box 54 is operatively coupled to each hub 56 of front wheel assemblies 18, 19 via respective half-shafts 58, 60. The half-shafts 58, 60 serve to provide for the transfer of power between the gear box 54 and the hubs 56. It is noted that each half-shaft 58, 60 may include one or more universal joints or ball-spline joints, which allow for the transfer of power and movement of the wheel assemblies 18, 19. The front brake system 62 includes a pair of brake disks 64 on either side of the gear box 54 and a corresponding pair of brake calipers 66. The brake calipers 66 are rigidly mounted to the housing of the front gear box 54 while the disks 64 are connected directly to the left and right half-shafts 58, 60.

The rear drive train 70 of the ATV 10 includes a driveline assembly unit 100 mounted to the rear portion 13 of the frame 12, which is operatively connected to the engine/transmission (not shown) via a second propeller shaft 78, and operatively connected to rear hubs 72 of the rear wheel assemblies 20 and 21 via respective half-shafts 74, 76. The driveline assembly unit 100 incorporates a gear assembly 115 (FIGS. 4 and 5) providing a right angle transfer between the second propeller shaft 78 and the half-shafts 74, 76 which may be of the differential or non-differential type, a rear brake mechanism 150 (FIGS. 4 and 5) and a torque limiting mechanism 170 (FIGS. 4 and 5) such that the driveline assembly unit 100 combines all the main power transfer and control systems of the rear drive train 70 in a compact housing.

Figure 3:
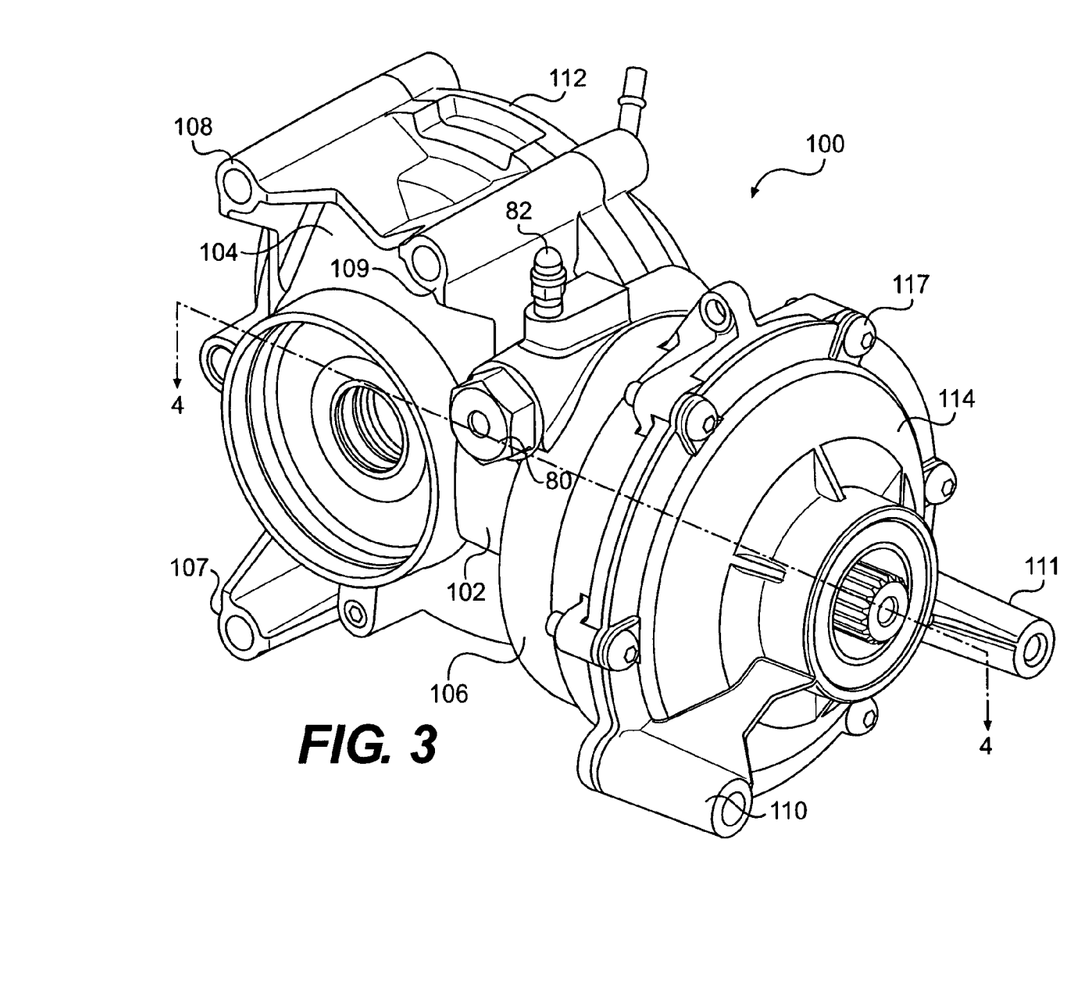
FIG. 3 is a perspective view of a driveline assembly unit of the rear drive train shown in FIG. 2.

With reference to FIG. 3, the driveline assembly unit 100 includes a main housing 102 having a rear portion 104 housing the gear box mechanism and a front portion 106 housing the rear brake mechanism 150 and the torque limiting mechanism 170. The rear portion 104 of the main housing 102 is closed by a side housing cover 112 while the front portion 106 of the main housing 102 is closed by a front housing cover 114. The side housing cover 112 and the front housing cover 114 are secured to the main housing 102 via fasteners 117 such as bolts. The front portion 106 of the main housing 102 includes a hydraulic brake piston 80 and a hydraulic fluid inlet 82 which is connected to the hydraulic brake line 84 (FIG. 1). The main housing 102 includes three transversal mounting brackets 107, 108 and 109 for securing the rear portion 104 of the main housing 102 to the frame 12 with fasteners inserted theretrough and two longitudinal brackets 110 and 111 for securing the front portion 106 of the main housing 102 to the frame 12 with fasteners.

Figure 4:
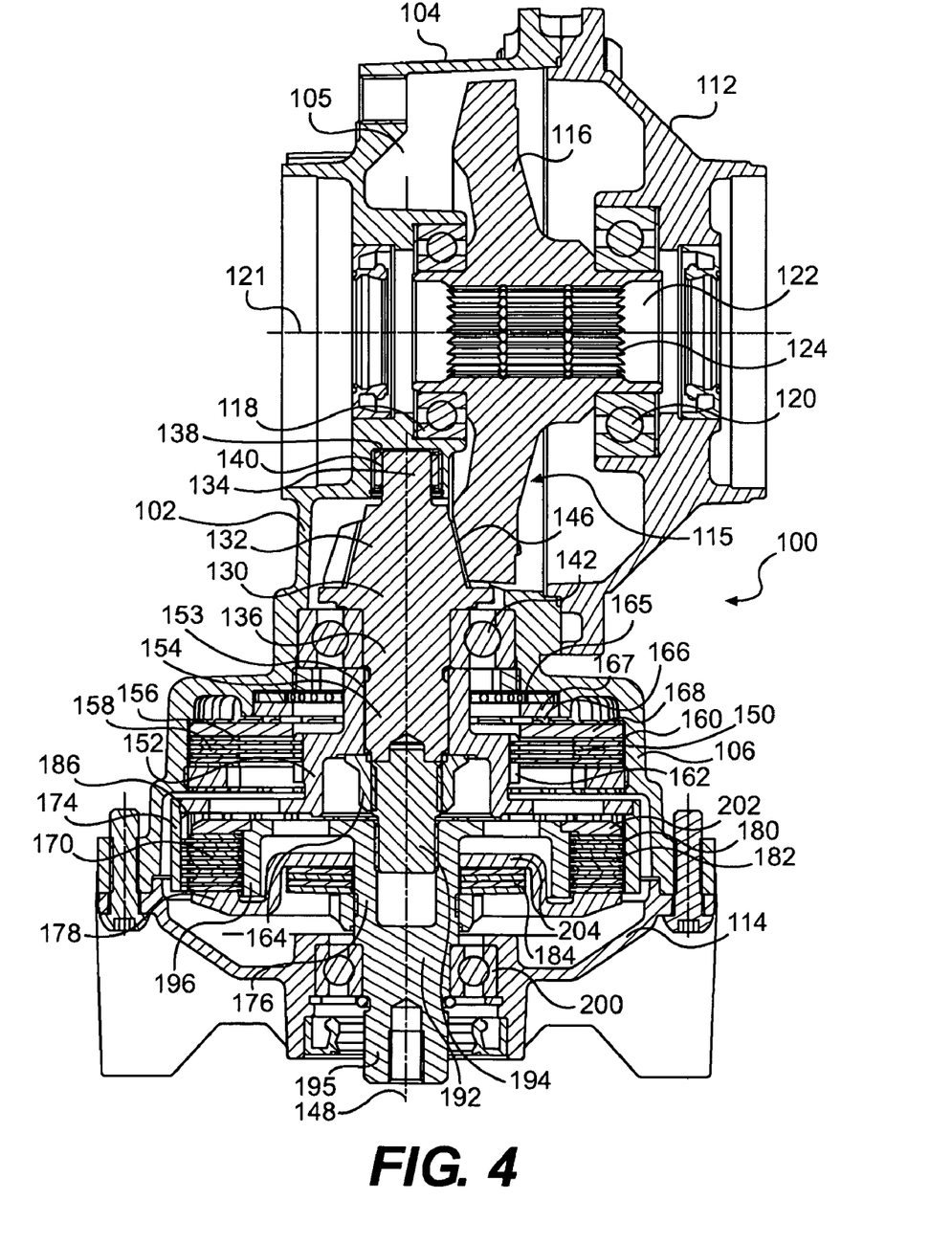
FIG. 4 is a cross sectional view taken through line 4-4 of the driveline assembly unit shown in FIG. 3.
Figure 5:
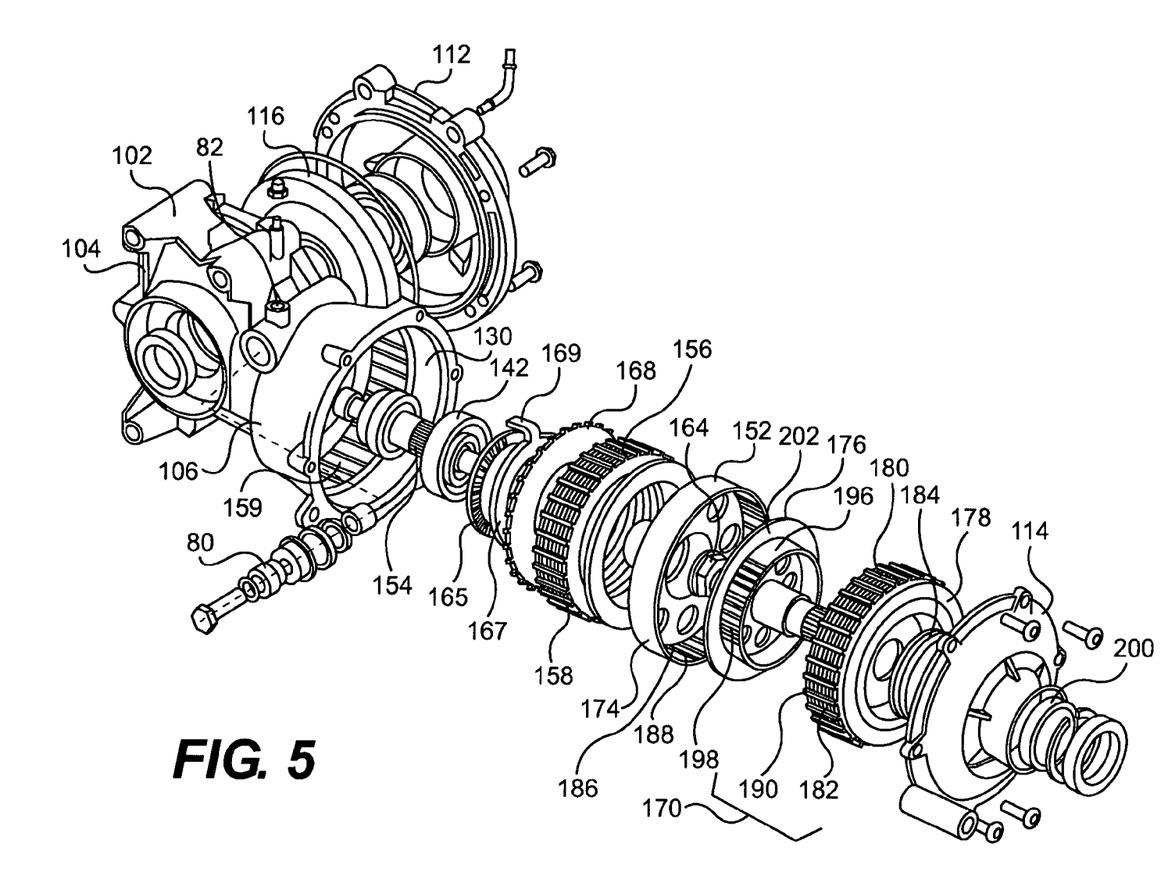
FIG. 5 is a perspective exploded view of the driveline assembly unit shown in FIGS. 3 and 4.

Referring now to FIGS. 4 and 5, which is exploded view of the driveline assembly unit 100, a bevel gear assembly 115 consisting of a ring gear 116 and a pinion gear 130 is housed and supported within the main housing 102. The ring gear 116 is mounted within a cavity 105 of the rear portion 104 of the main housing 102 and is secured and supported therein by a pair of ball bearings 118, 120 which allow rotation of the ring gear 116 about a transversal axis of rotation 121 with minimum friction. The ring gear 116 includes a central aperture 122 having splines 124 on its inner wall which are adapted to engage the splined end of the half-shafts 74, 76 (FIG. 2) inserted therein when the driveline assembly unit 100 is installed on the ATV 10 during assembly of the ATV 10. The pinion gear 130 includes a bevel gear portion 132, a protrusion 134 extending from one end of the bevel gear portion 132, and a shaft portion 136 extending from the other end of the bevel gear 132. The protrusion 134 of the pinion gear 130 is inserted into a cavity 138 of the rear portion 104 of the main housing 102 and is supported for rotational movement by a needle bearing 140. The shaft portion 136 of the pinion gear 130 is supported for rotational movement by a ball bearing 142 mounted within the front portion 106 of the main housing 102. The bevel gear portion 132 of the pinion gear 130 engages the ring gear 116 at 146 and in operation the rotational movement of the pinion gear 130 about a longitudinal axis 148 is transferred into rotational movement of the ring gear 116 about the transversal axis of rotation 121.

It should be noted that the illustrated driveline assembly unit 100 includes a non-differential type bevel gear assembly 115 however, a differential type or any other type of gear system may be used that is capable of transferring power between the propeller shaft 78 and wheel assemblies 20, 21.

The shaft portion 136 of the pinion gear 130 is connected to a rear brake mechanism consisting of a wet brake clutch assembly 150. An outer slip clutch member 152 is connected to the shaft portion 136 of the pinion gear 130. The outer slip clutch member 152 includes a splined inner aperture 153 which engages the splined end 154 of the shaft portion 136 of the pinion gear 130. The outer slip clutch member 152 is secured to the shaft portion 136 of the pinion gear 130 by a nut 164. The wet brake clutch assembly 150 includes a stack of stationary discs 156 and rotating discs 158. The stationary discs 156 are slotted in their outer peripheries and engage grooves 159 on the inner wall 160 of the front portion 106 of the main housing 102 and are therefore stationary. The rotating discs 158 are slotted on their inner circumference and engage splines 162 on the outer slip clutch member 152 and therefore rotate with the pinion gear 130.

Figure 6A:
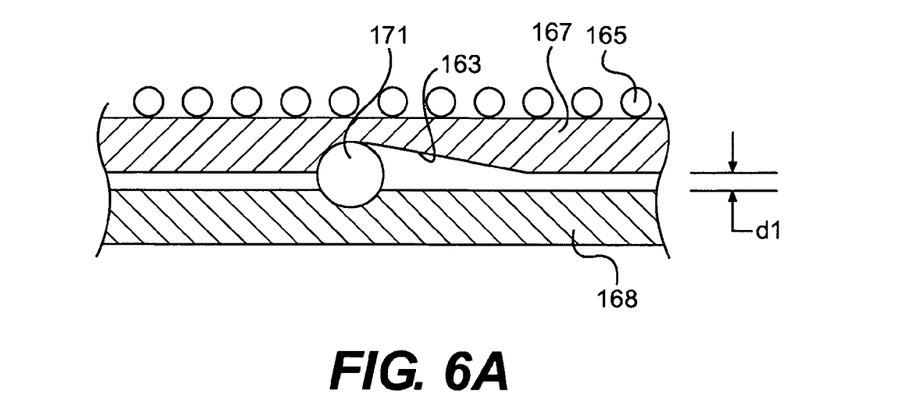
FIG. 6A is cross sectional view of a ball ramp actuator for actuating the rear brake mechanism of the driveline assembly unit shown in FIGS. 3, 4 and 5 in its initial position.

The wet brake clutch assembly 150 is actuated by a ball ramp assembly 166 including a drive cam 167, a driven cam 168 positioned adjacent to the stack of stationary discs 156 and rotating discs 158, and a series of steel balls 171 (FIG.

Figure 6B:
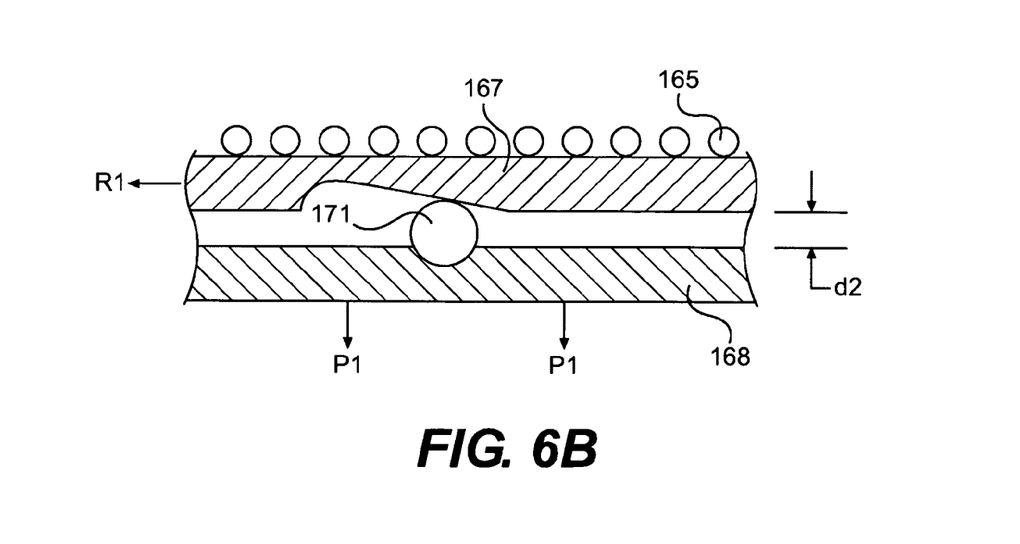
FIG. 6B is cross sectional view of the ball ramp actuator shown in FIG. 6B when it is actuated.

6A). The drive cam 167 is resting on a needle bearing 165 such that it may rotate easily. The drive cam 167 includes several rising depth slots 163 (FIG. 6A) in which the steel balls 171 are placed and a lever 169 which is connected to the hydraulic piston 80 itself connected and controlled by the rear brake actuating mechanism 44 mounted on the left-hand side of the handlebars 26 (FIG. 1) or by the pedal (not shown). In operation, when the rear brake actuating mechanism 44 is pressed by the driver, hydraulic fluid under pressure enters the hydraulic piston 80 which in turn pushes the lever 169 which rotates the drive cam 167. The hydraulic fluid within the brake piston 80 is sealed from the interior of the main housing 102 such that there is no contamination with brake fluid. As shown in FIG. 6A, the drive cam 167 rests on needle bearings 165 to facilitate its rotation. The drive cam 167 includes several rising depth slots 163 (only one shown) on the side facing the driven cam 168. Steel balls 171 are inserted in the rising depth slots 163. In FIG. 6A, the drive cam 167 is not rotated and the steel balls 171 are confined to the bottom of the rising depth slots 163 such that a distance d1 separates the drive cam 167 and the driven cam 168. When the rear brake actuating mechanism 44 is pressed by the driver, the drive cam 167 is rotated in the direction R1 as shown in FIG. 6B such that the driven cam 168 is pushed in the direction P1 by the steel balls 171 rising along the rising depth slots 163 and an axial force is applied to the stationary discs 156 and rotating discs 158. The stationary discs 156 are pressed against the rotating discs 158 with the effect of decelerating the outer slip clutch member 152 connected to the rotating discs 158. Since the outer slip clutch member 152 is connected to the pinion gear 130 which is connected to the ring gear 116, brake force is effectively applied to the rear wheel assemblies 20, 21 thereby decelerating the ATV 10.

It is understood that although a hydraulic brake actuating system is shown, the ball ramp assembly 166 can be actuated by a cable connected at one end to the lever 169 which rotates the drive cam 167, and at the other end to the rear brake actuating mechanism 44 mounted on the left-hand side of the handlebars 26 (FIG. 1).

Referring back to FIGS. 4 and 5, the outer slip clutch member 152 is also part of the torque limiting mechanism 170 which is upstream from the wet brake assembly 150. The torque limiting mechanism 170 consists of a slip clutch including the outer slip clutch member 152, an inner slip clutch member 176, drive discs 182, and driven discs 180, a pressure member 178, and a biasing member in the form of Belleville spring washers 184. The outer slip clutch member 152 includes a circular front portion 174 having an inner wall 186 which includes a series of slots 188 that receive corresponding external teeth 190 (FIG. 5) of the driven discs 180 such that the driven discs 180 rotate with the outer slip clutch member 152. The inner slip clutch member 176 includes a central shaft portion 192 having a splined end 195 adapted for connection to the propeller shaft 78 (FIG. 2). The inner slip clutch member 176 includes a cylindrical wall 196 having a series of notches or grooves 198 adapted to receive the inner teeth (not shown) of the drive discs 182 such that the drive discs 182 rotate with the inner slip clutch member 176. The inner slip clutch member 176 also includes a flange portion 202. The inner slip clutch member 176 is maintained in alignment with the longitudinal axis of rotation 148 and is supported by a short shaft 194 extending from the nut 164 and by a ball bearing 200 mounted on the front housing cover 114 of the main housing 102. The spring washers 184 abut and push against the inner portion 204 of the pressure plate 178 and maintain the drive and driven discs 180,182 engaged together up to a predetermined pressure corresponding to a predetermined maximum torque beyond which the drive and driven discs 180,182 will slip thereby avoiding potential damages caused by excessive torque on the various components of the rear drive train 70. The force required by the biasing mechanism is determined by the maximum torque to be distributed to the drive train components. Any torque higher than the predetermined maximum torque will cause the drive and driven discs 180,182 to slip within the torque limiting mechanism 170 which will protect the drive train components.

The main housing 102 is filled with lubricating fluid which lubricates the gear assembly 115, the rear brake mechanism 150 and the torque limiting mechanism 170 such that the main components of the driveline assembly unit 100 are lubricated with the same fluid eliminating the need for sealing the main components from each other. Only the hydraulics of the hydraulic brake piston 80 is sealed from the main housing 102.

The pinion gear 130, the wet brake clutch assembly 150 and the torque limiting mechanism 170 are coaxial with the longitudinal axis 148 such that the wet brake clutch assembly 150 and the torque limiting mechanism 170 are very close together and the driveline assembly unit 100 is compact.

Figure 7:
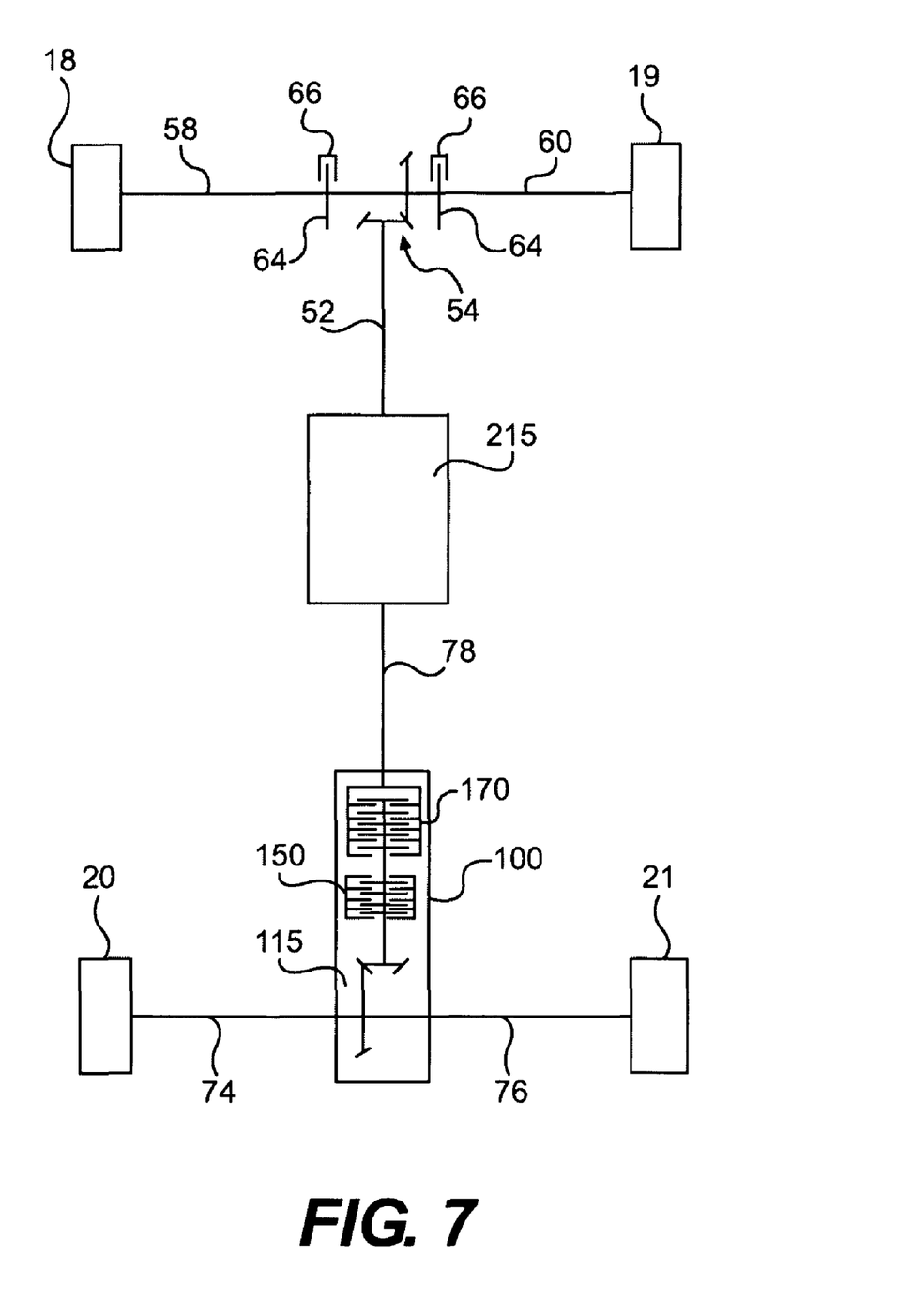
FIG. 7 is a schematic plan view of the drive train of the ATV shown in FIG. 1.

Referring now to FIG. 7, which is a schematic plan view of the drive train of ATV 10, power from the engine/transmission assembly 215 is transferred to the front and rear wheel assemblies 18, 19, 20, 21 through the propeller shafts 52 and 78 connected to the engine/transmission assembly 215. The propeller shaft 52 is connected to the front gear box 54 which redirects the motive power from the engine/transmission assembly 215 to the left and right frontal half-shafts 58 and 60. Brake disk and caliper assemblies 64, 66 are positioned on both sides of the front gear box 54 and provide braking force for the front wheel assemblies 18, 19. Propeller shaft 78 is connected to the driveline assembly unit 100. In the driveline assembly unit 100, motive power from the engine/transmission assembly 215 is initially passed through the torque limiting mechanism 170 and then through the gear assembly 115 which redirects the motive power to the left and right rear half-shafts 74 and 76. The wet brake clutch assembly 150 is positioned between the torque limiting mechanism 170 and the gear assembly 115 and provides braking force for the rear wheel assemblies 20, 21. As illustrated, the wet brake clutch assembly 150, the torque limiting mechanism 170 and the propeller shaft 78 are coaxial enabling a compact design of the driveline assembly 100.

Figure 8:
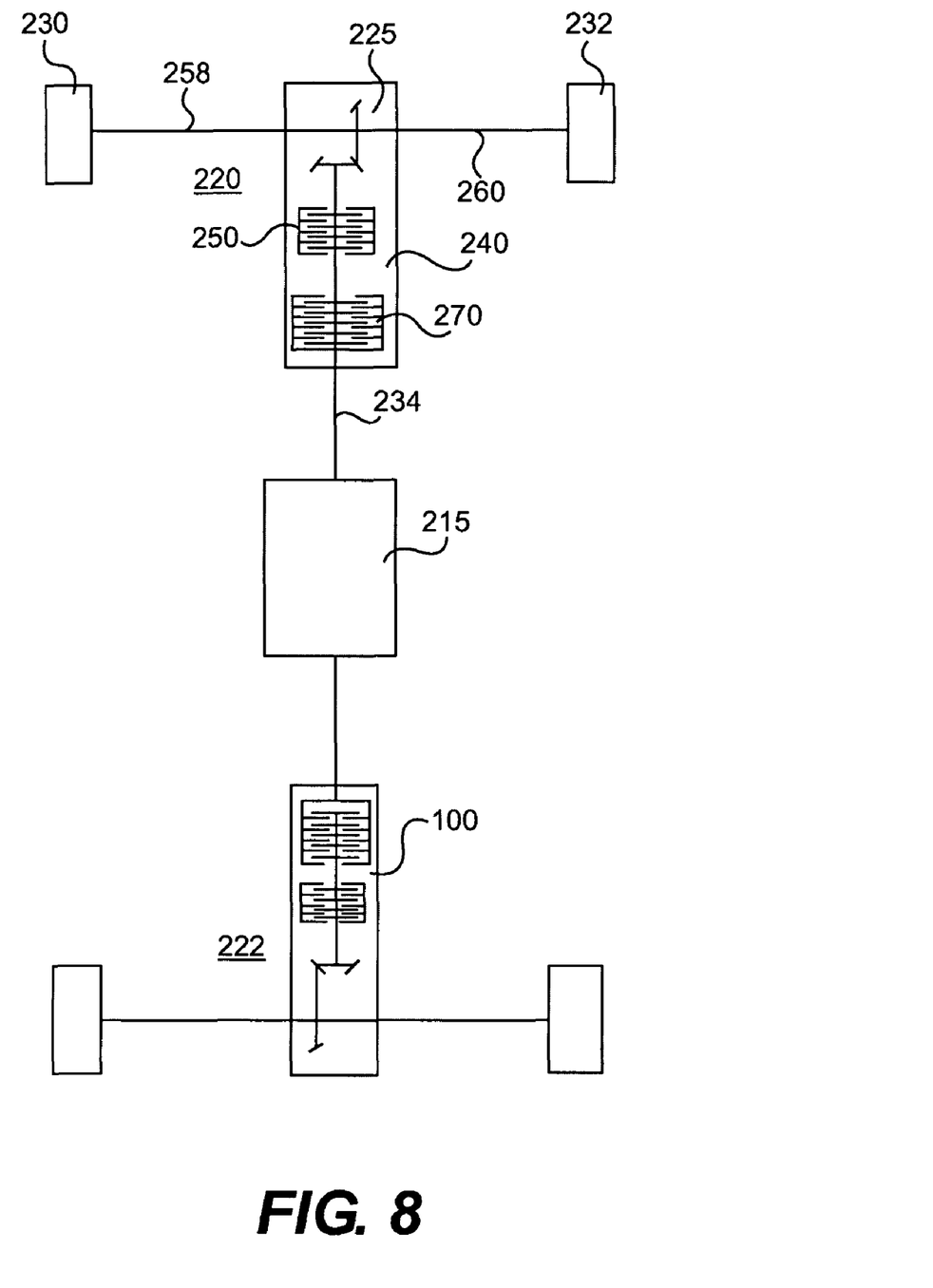
FIG. 8 is a schematic plan view of a second embodiment of a drive train of an ATV.

Referring now to FIG. 8, which is a schematic plan view of a second embodiment of the drive train of an ATV including two driveline assembly units 100 and 240; one in the front portion 220 of the drive train and one in the rear portion 222 of the drive train. The rear portion 222 of the drive train is identical to the rear portion of the drive train of the ATV 10 shown in FIGS. 1, 2 and 7, whereas the front portion 220 includes a second driveline assembly unit 240 which is identical to the driveline assembly units 100 but oriented in the opposite direction. Motive power from the engine/transmission assembly 215 is transferred to the front wheel assemblies 230, 232 through a propeller shaft 234 and through the front driveline assembly unit 240. Motive power from the propeller shaft 234 is initially passed through a torque limiting mechanism 270 and then through a bevel gear assembly 225 which redirects the motive power to left and right front half-shafts 258 and 260. A wet brake clutch assembly 250 is positioned between the torque limiting mechanism 270 and the bevel gear assembly 225 and provides braking force for the front wheel assemblies 230, 232.

Figure 9:
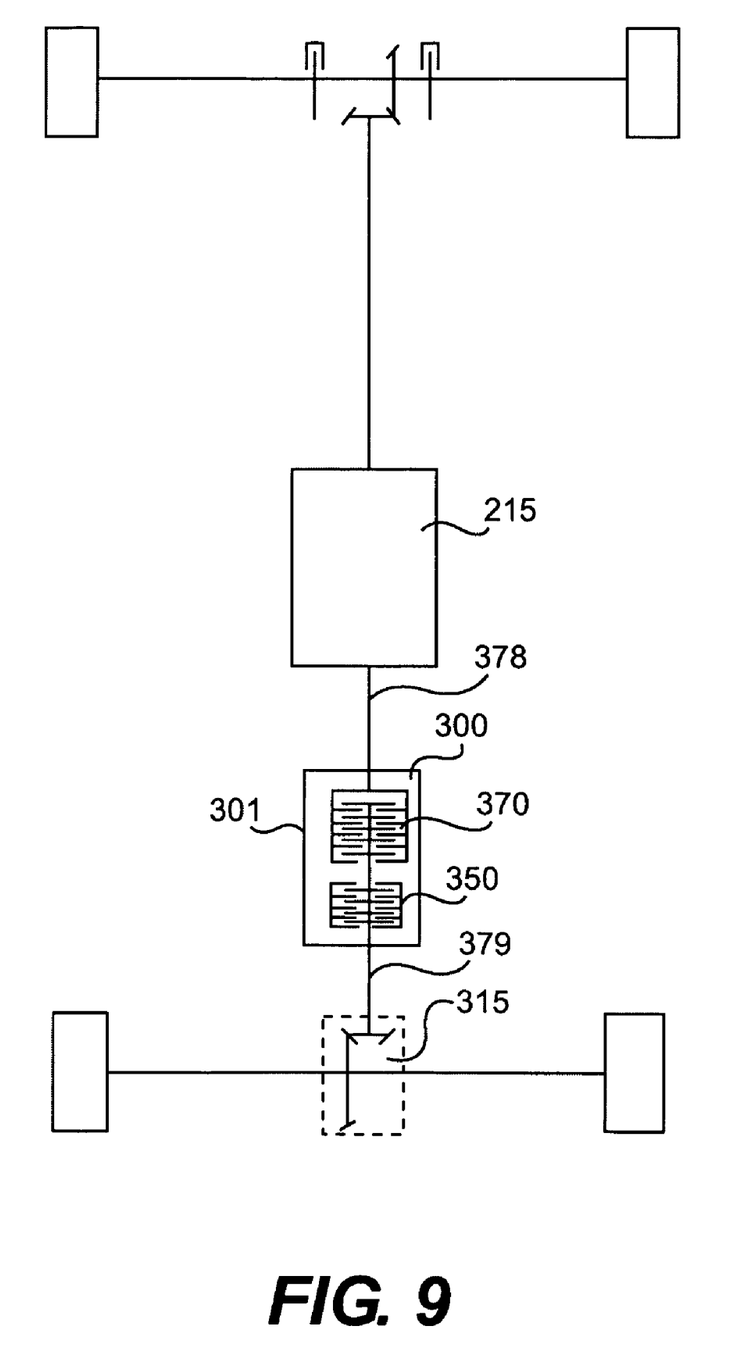
FIG. 9 is a schematic plan view of a third embodiment of a drive train of an ATV.

With reference to FIG. 9, there is shown a schematic third embodiment of a drive train including a driveline unit 300. As illustrated, the driveline unit 300 includes a torque limiting mechanism 370 and a wet brake clutch assembly 350 but is separated from the bevel gear assembly 315. The engine 215 is connected to the driveline unit 300 through a propeller shaft 378 and the driveline unit 300 is connected to the bevel gear assembly 315 through a short shaft 379. The torque limiting mechanism 370 and the wet brake clutch assembly 350 are coaxial and housed within the same housing 301 which is comparatively smaller and more compact than the main housing 102 of the driveline assembly units 100.

Figure 10:
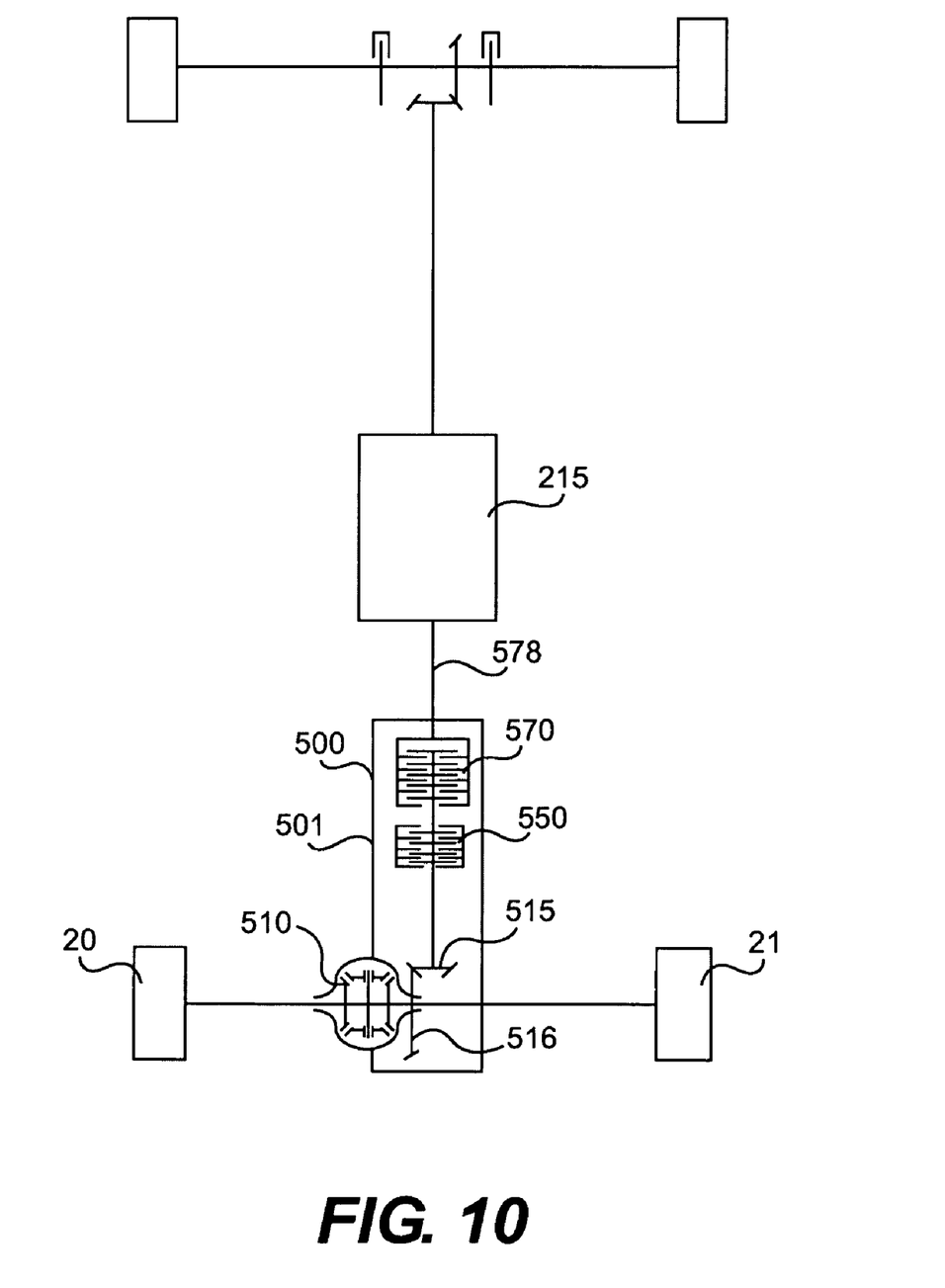
FIG. 10 is a schematic plan view of a fourth embodiment of a drive train of an ATV.

With reference to FIG. 10, there is shown a schematic fourth embodiment of a drive train including a driveline unit 500. As illustrated, the driveline unit 500 includes a torque limiting mechanism 570, a wet brake clutch assembly 550 and a bevel gear assembly 515. The driveline unit 500 further includes a differential gear assembly 510 operatively connected to the ring gear 516 of the bevel gear assembly 515 which allows relative rotational movement between the left and right wheels 20 and 21. The engine 215 is connected to the driveline unit 500 through a propeller shaft 578. The torque limiting mechanism 570 and the wet brake clutch assembly 550 are coaxial and housed within the main housing 501 of the driveline unit 500. The bevel gear assembly 515 and the differential gear assembly 510 are also housed within the main housing 501. It is also contemplated that bevel gear assembly 515 and the differential gear assembly 510 be separated from the main housing 501 in a similar fashion as the driveline unit 300 shown in FIG. 9.

Figure 11:
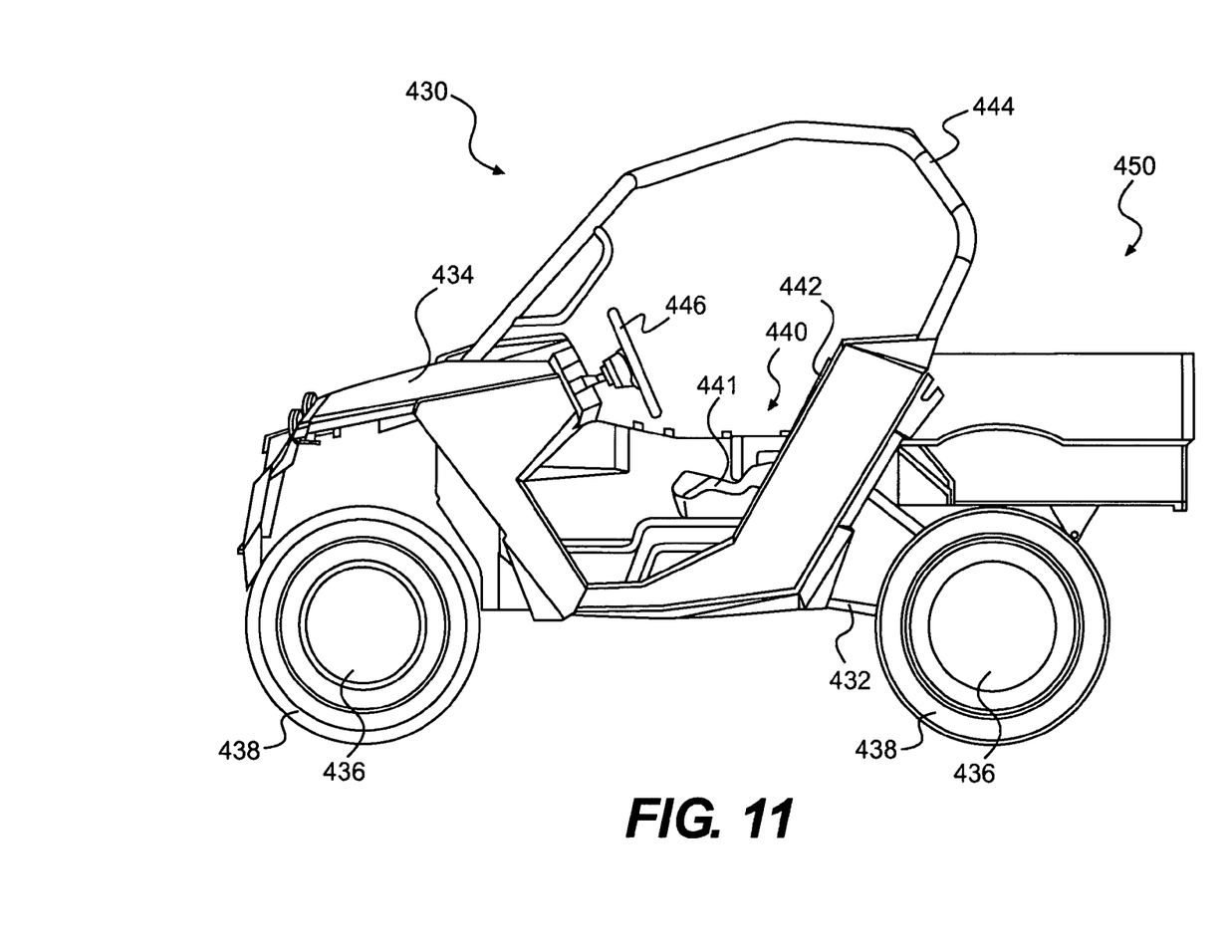
FIG. 11 is a left side elevation view of a recreational utility vehicle (RUV) equipped with a driveline assembly unit in accordance with one aspect of the present invention.
Figure 12:
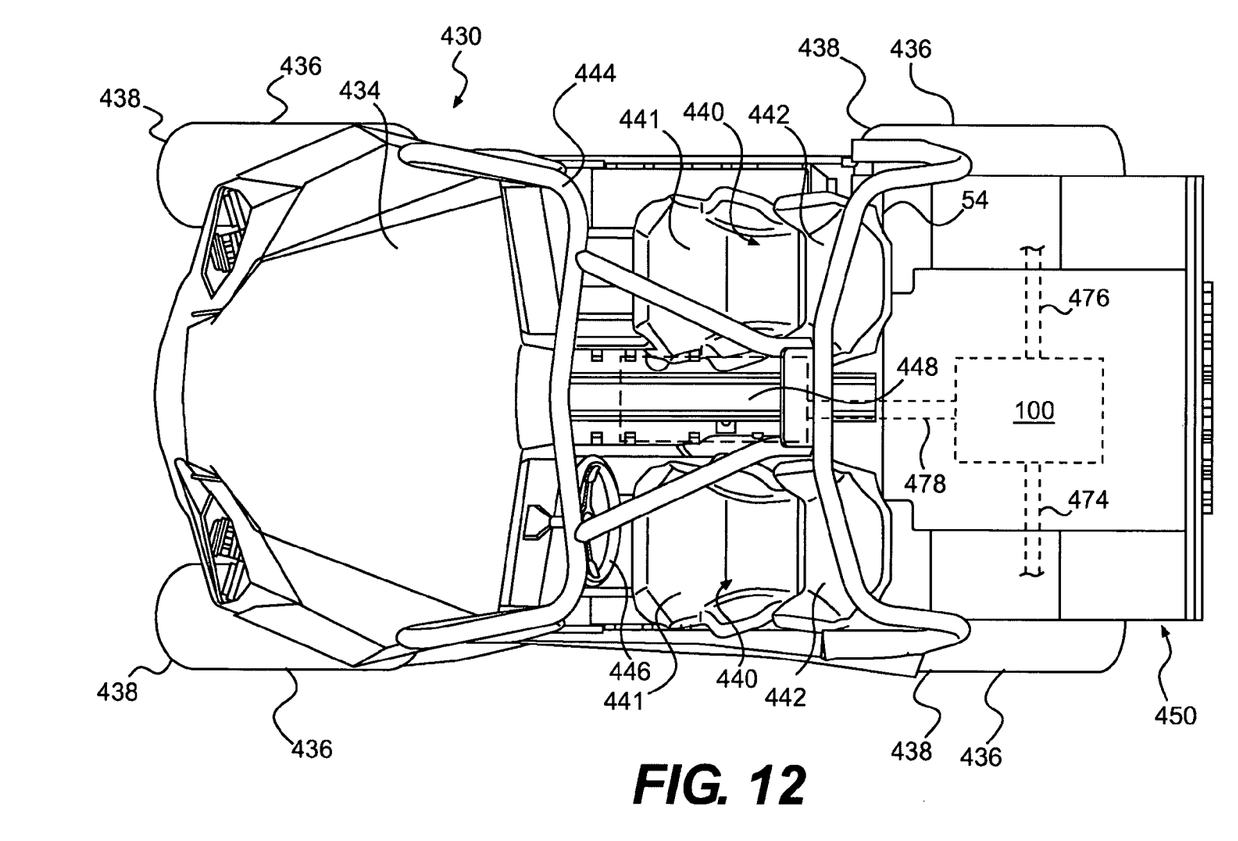
FIG. 12 is a top view of the RUV of FIG. 10.

FIGS. 11 and 12 illustrate an RUV 430. The RUV 430 has a frame 432 to which a vehicle body 434 is mounted. Four wheels 436 are suspended from the frame 432 via suspension elements (not shown). Each of the four wheels 436 has a tire 438. It is contemplated that the RUV 430 could have six or more wheels 436. As best seen in FIG. 12, a pair of seats 440, each having a seat base 441 and a backrest 442, are mounted laterally beside each other on the frame 432 to accommodate a driver and a passenger of the RUV 430. A cage 444 is connected to the frame 432 and is disposed around the area where the seats 440 are located. A steering assembly including a steering wheel 446 is disposed forwardly of the driver seat 440. The steering assembly is operatively connected to the two front wheels 436 to permit steering of the RUV 430. An engine 448, shown schematically in dotted lines in FIG. 12, is mounted to the frame 432 between the seats 440. The engine 448 is operatively connected to the four wheels 436 to power the RUV 430. It is contemplated that the engine 448 could be operatively connected to only two of the wheels 436. A cargo box 450 is pivotally mounted to the frame 432 rearwardly of the seats 440. The rear drive train of the RUV 430 includes a driveline assembly unit 100 as previously described which is operatively connected to the engine 448 via a propeller shaft 478, and operatively connected to rear wheels 436 via respective half-shafts 474 and 476. The driveline assembly unit 100 incorporates a gear assembly (FIGS. 4 and 5) providing a right angle transfer between the propeller shaft 478 and the half-shafts 474, 476 which may be of the differential or non-differential type, a rear brake mechanism and a torque limiting mechanism (FIGS. 4 and 5) such that the driveline assembly unit 100 combines all the main power transfer and control systems of the rear drive train of the RUV 430.

The RUV 430 has other features and components such as headlights and handles. As it is believed that these features and components would be readily recognized by one of ordinary skill in the art, further explanation and description of these components will not be provided herein.

Modifications and improvement to the above described embodiments of the present invention may become apparent to those skilled in the art. The foregoing description is intended to be exemplary rather than limiting. Furthermore, the dimensions of features of various components that may appear on the drawings are not meant to be limiting, and the size of the components therein can vary from the size that may be portrayed in the figures herein. The scope of the present invention is therefore intended to be limited solely by the scope of the appended claims.

What is claimed is:

1. An off-road vehicle comprising:
a frame;
a pair of front wheels connected to the frame through a front suspension and a pair of rear wheels connected to the frame through a rear suspension;
at least one seat mounted on the frame for supporting a rider;
a steering assembly disposed on the frame and operatively connected to the pair of front wheels for steering the vehicle;
an engine disposed on the frame;
a bevel gear assembly;
a propeller shaft operatively connecting the engine with the bevel gear assembly;
left and right half shafts connecting the bevel gear assembly to one of the pair of front wheels and the pair of rear wheels; and
a driveline assembly unit operatively connecting the propeller shaft with the bevel gear assembly; the driveline assembly unit including:
a main housing,
a slip clutch torque limiting mechanism operatively connected to the propeller shaft, the slip clutch torque limiting mechanism including:
an outer slip clutch member;
an inner slip clutch member;
drive discs and driven discs between the outer slip clutch member and the inner slip clutch member; and
a biasing member adapted to apply pressure to drive discs and driven discs;
a wet brake clutch assembly operatively connecting to the slip clutch torque limiting mechanism and the bevel gear assembly;
the slip clutch torque limiting mechanism and the wet brake clutch assembly being housed within the main housing, the wet brake clutch assembly and the slip clutch torque limiting mechanism being operatively connected through the outer slip clutch member of the slip clutch torque limiting mechanism.

2. An off-road vehicle as defined in claim 1, wherein the main housing contains lubricating fluid; the slip clutch torque limiting mechanism and the wet brake clutch assembly being lubricated by the same lubricating fluid.

3. An off-road vehicle as defined in claim 1, wherein the bevel gear assembly is housed within the main housing of the driveline assembly unit.

4. An off-road vehicle as defined in claim 1, wherein the wet brake clutch assembly is actuated by a ball ramp assembly positioned within the main housing of the driveline assembly unit.

5. An off-road vehicle as defined in claim 1, including two driveline assembly units, a first driveline assembly unit operatively connected to the rear wheels and a second driveline assembly unit operatively connected to the front wheels.

6. An off-road vehicle comprising:
a frame;
a pair of front wheels connected to the frame through a front suspension and a pair of rear wheels connected to the frame through a rear suspension;
at least one seat mounted on the frame for supporting a rider;
a steering assembly disposed on the frame and operatively connected to the pair of front wheels for steering the vehicle;
an engine disposed on the frame;
a bevel gear assembly;
a propeller shaft operatively connecting the engine with the bevel gear assembly;
left and right half shafts connecting the bevel gear assembly to one of the pair of front wheels and the pair of rear wheels; and
a driveline assembly unit operatively connecting the propeller shaft with the bevel gear assembly; the driveline assembly unit including:
a main housing,
a slip clutch torque limiting mechanism operatively connected to the propeller shaft,
a wet brake clutch assembly operatively connecting to the slip clutch torque limiting mechanism and the bevel gear assembly, the wet brake clutch assembly being actuated by a ball ramp assembly positioned within the main housing of the driveline assembly unit, the wet brake clutch assembly including a stack of rotating discs and stationary discs, the rotating discs and stationary discs being movable via the ball ramp assembly, the ball ramp assembly including:
a drive cam and a driven cam positioned adjacent the stack of rotating and stationary discs, and
a series of steel balls positioned between the drive cam and the driven cam; one of the drive cam and driven cam including rising depth slots in which the steel balls are placed such that a rotation of one of the cams increases the distance between the drive cam and driven cam and applies an axial force to the rotating discs and stationary discs;
the slip clutch torque limiting mechanism and the wet brake clutch assembly being housed within the main housing.

7. An off-road vehicle as defined in claim 6, wherein the wet brake clutch assembly further includes a hydraulic piston and the drive cam includes a lever connected to the hydraulic piston.

8. An off-road vehicle as defined in claim 6, wherein the wet brake clutch assembly includes a brake cable and the drive cam includes a lever connected to the brake cable.

9. An off-road vehicle as defined in claim 6, wherein the main housing contains lubricating fluid; the slip clutch torque limiting mechanism and the wet brake clutch assembly being lubricated by the same lubricating fluid.

10. An off-road vehicle as defined in claim 6, wherein the bevel gear assembly is housed within the main housing of the driveline assembly unit.

11. An off-road vehicle as defined in claim 6, including two driveline assembly units, a first driveline assembly unit operatively connected to the rear wheels and a second driveline assembly unit operatively connected to the front wheels.

12. An off-road vehicle comprising:
a frame;
a pair of front wheels connected to the frame through a front suspension and a pair of rear wheels connected to the frame through a rear suspension;
at least one seat mounted on the frame for supporting a rider;
a steering assembly disposed on the frame and operatively connected to the pair of front wheels for steering the vehicle;
an engine disposed on the frame;
a bevel gear assembly;
a propeller shaft operatively connecting the engine with the bevel gear assembly;
left and right half shafts connecting the bevel gear assembly to one of the pair of front wheels and the pair of rear wheels; and
a driveline assembly unit operatively connecting the propeller shaft with the bevel gear assembly; the driveline assembly unit including:
a main housing,
a slip clutch torque limiting mechanism operatively connected to the propeller shaft, the slip clutch torque limiting mechanism including;
an outer slip clutch member;
an inner slip clutch member;
drive discs and driven discs between the outer slip clutch member and the inner slip clutch member; and
a biasing member adapted to apply pressure to the drive discs and driven discs;
a wet brake clutch assembly operatively connecting to the slip clutch torque limiting mechanism and the bevel gear assembly, the wet brake clutch assembly and the slip clutch torque limiting mechanism being operatively connected through the outer slip clutch member of the slip clutch torque limiting mechanism;
the propeller shaft, the slip clutch torque limiting mechanism and the wet brake clutch assembly being coaxial.

13. An off-road vehicle as defined in claim 12, wherein the bevel gear assembly is housed within the main housing of the driveline assembly unit.

14. An off-road vehicle as defined in claim 12, wherein the wet brake clutch assembly is actuated by a ball ramp assembly positioned within the main housing the driveline assembly unit.

15. An off-road vehicle as defined in claim 12, including two driveline assembly units, a first driveline assembly unit operatively connected to the rear wheels and a second driveline assembly unit operatively connected to the front wheels.

16. An off-road vehicle comprising:
a frame;
a pair of front wheels connected to the frame through a front suspension and a pair of rear wheels connected to the frame through a rear suspension;
at least one seat mounted on the frame for supporting a rider;
a steering assembly disposed on the frame and operatively connected to the pair of front wheels for steering the vehicle;
an engine disposed on the frame;
a bevel gear assembly;
a propeller shaft operatively connecting the engine with the bevel gear assembly;
left and right half shafts connecting the bevel gear assembly to one of the pair of front wheels and the pair of rear wheels; and
a driveline assembly unit operatively connecting the propeller shaft with the bevel gear assembly; the driveline assembly unit including:
a main housing, a slip clutch torque limiting mechanism operatively connected to the propeller shaft, a wet brake clutch assembly operatively connecting to the slip clutch torque limiting mechanism and the bevel gear assembly, the wet brake clutch assembly being actuated by a ball ramp assembly positioned within the main housing the driveline assembly unit, the wet brake clutch assembly including a stack of rotating and stationary discs, the rotating and stationary discs being pressed together via the ball ramp assembly, the ball ramp assembly including:

a drive cam and a driven cam positioned adjacent the stack of rotating and stationary discs, and a series of steel balls positioned between the drive cam and the driven cam; one of the drive cam and driven cam including rising depth slots in which the steel balls are placed such that a rotation of one of the cams increases the distance between the drive cam and driven cam and applies an axial force to the stack of rotating and stationary discs, the propeller shaft, the slip clutch torque limiting mechanism and the wet brake clutch assembly being coaxial.

17. An off-road vehicle as defined in claim 16, wherein the wet brake clutch assembly further includes a hydraulic piston and the drive cam includes a lever connected to the hydraulic piston.

18. An off-road vehicle as defined in claim 16, wherein the wet brake clutch assembly includes a brake cable and the drive cam includes a lever connected to the brake cable.

19. An off-road vehicle as defined in claim 16, wherein the bevel gear assembly is housed within the main housing of the driveline assembly unit.

20. An off-road vehicle as defined in claim 16, including two driveline assembly units, a first driveline assembly unit operatively connected to the rear wheels and a second driveline assembly unit operatively connected to the front wheels.

21. A driveline assembly unit including:

a main housing containing lubricating fluid,
a slip clutch torque limiting mechanism; and
a wet brake clutch assembly;
the slip clutch torque limiting mechanism and the wet brake clutch assembly both supported and housed within the main housing;
the slip clutch torque limiting mechanism including:
an outer slip clutch member;
an inner slip clutch member;
drive discs and driven discs between the outer slip clutch member and the inner slip clutch member; and
a biasing member adapted to apply pressure to the drive discs and driven discs;
the wet brake clutch assembly including:
a stack of rotating discs and stationary discs, and
an actuator for pressing the stack of rotating discs and stationary discs together;
the wet brake clutch assembly and the slip clutch torque limiting mechanism being operatively connected together through the outer slip clutch member of the slip clutch torque limiting mechanism.

22. A driveline assembly unit as defined in claim 21, wherein the wet brake clutch assembly is actuated by a ball ramp assembly including:

a drive cam and a driven cam positioned adjacent the rotating discs and stationary discs, and a series of steel balls positioned between the drive cam and the driven cam; one of the cam including rising depth slots in which the steel balls are placed such that a rotation of one of the cams increases the distance between the drive cam and driven cam and applies an axial force to the rotating discs and stationary discs.

23. A driveline assembly unit as defined in claim 21, further comprising a bevel gear assembly positioned within the main housing and operatively connected to the wet brake clutch assembly and the slip clutch torque limiting mechanism.

* * * * *